(12) United States Patent
Lin et al.

(10) Patent No.: US 8,103,159 B2
(45) Date of Patent: Jan. 24, 2012

(54) FLASHING CONTROL METHOD FOR A DIGITAL CAMERA

(75) Inventors: Yu-Hong Lin, Tainan (TW); Cheng-Chang Wu, Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 0 days.

(21) Appl. No.: 12/816,212

(22) Filed: Jun. 15, 2010

(65) Prior Publication Data

US 2011/0280560 A1  Nov. 17, 2011

(30) Foreign Application Priority Data

May 14, 2010  (TW) .............................. 99115525 A

(51) Int. Cl.
*G03B 15/03*  (2006.01)
(52) U.S. Cl. ........................................ 396/164; 348/371
(58) Field of Classification Search .................. 396/157, 396/164; 348/371
See application file for complete search history.

(56) References Cited

U.S. PATENT DOCUMENTS

| | | | |
|---|---|---|---|
| 4,768,876 A | | 9/1988 | Okino |
| 5,960,217 A | * | 9/1999 | Goto .............................. 396/65 |
| 2005/0157206 A1 | * | 7/2005 | Kato .............................. 348/370 |
| 2006/0262215 A1 | * | 11/2006 | Wang ............................. 348/362 |
| 2009/0109316 A1 | * | 4/2009 | Matsui ...................... 348/333.01 |
| 2009/0160944 A1 | * | 6/2009 | Trevelyan et al. ............. 348/187 |
| 2010/0013956 A1 | * | 1/2010 | Furuya et al. ............. 348/229.1 |
| 2011/0115971 A1 | * | 5/2011 | Furuya et al. ................. 348/371 |

OTHER PUBLICATIONS

European Search Report, EP 10169726, mailed Apr. 5, 2011.

* cited by examiner

*Primary Examiner* — Rodney Fuller
*Assistant Examiner* — Fang-Chi Chang
(74) *Attorney, Agent, or Firm* — Stout, Uxa, Buyan & Mullins, LLP

(57) ABSTRACT

The present invention is directed to a flashing control method for a digital camera. Indices respectively corresponding to sensitivity values are firstly determined. Subsequently, main-flash intensities are respectively obtained with respect to the sensitivity values such that their target brightness values are substantially the same after exposure, thereby constructing an energy table. Further, a predetermined preflash is fired to obtain a corresponding preflash brightness value with respect to each distinct distance. Main-flash indices are then respectively obtained according to maximum main-flash intensity and the energy table with respect to the distinct distances such that the target brightness values are substantially the same after exposure, thereby constructing a preflash table. During picture capturing, the main-flash intensity is obtained according to the preflash brightness value and the preflash table.

19 Claims, 3 Drawing Sheets

Energy table

| 15000 | 11250 | 5668 | 3896 | 3409 | 2982 | 2655 | 2406 | 2273 | 2067 | 1920 | 1860 | 1801 | 1625 | 1521 | 1468 |
|---|---|---|---|---|---|---|---|---|---|---|---|---|---|---|---|
| 1422 | 1286 | 1240 | 1193 | 1125 | 1107 | 1034 | 1009 | 929 | 914 | 895 | 839 | 837 | 824 | 798 | 773 |
| 754 | 700 | 676 | 670 | 626 | 606 | 601 | 579 | 566 | 561 | 534 | 521 | 510 | 496 | 465 | 463 |
| 557 | 448 | 441 | 434 | 420 | 404 | 392 | 379 | 371 | 364 | 357 | 349 | 343 | 337 | 331 | 325 |
| 319 | 314 | 309 | 304 | 299 | 295 | 291 | 287 | 284 | 282 | 280 | 278 | 274 | 270 | 266 | 363 |

FIG. 2

Preflash table

| distance (cm) | 500 | 450 | 400 | 350 | 300 | 250 | 200 | 150 | 100 | 80 | 60 | 40 | 20 |
|---|---|---|---|---|---|---|---|---|---|---|---|---|---|
| preflash brightness | 11 | 17 | 23 | 27 | 38 | 54 | 85 | 153 | 316 | 490 | 886 | 1740 | 3968 |
| ISO main-flash intensity | Max | Max | Max | Max | Max | Max | Max | Max | 2606 | 1406 | 937 | 560 | 282 |
| index | 76 | 83 | 89 | 95 | 101 | 109 | 119 | 128 | 134 | 144 | 152 | 169 | 201 |

FIG. 3

FLASHING CONTROL METHOD FOR A DIGITAL CAMERA

CROSS-REFERENCE TO RELATED APPLICATIONS

The entire contents of Taiwan Patent Application No. 099115525, filed on May 14, 2010, from which this application claims priority, are incorporated herein by reference.

BACKGROUND OF THE INVENTION

1. Field of the Invention

The present invention generally relates to a digital camera, and more particularly to a flashing control method for a digital camera.

2. Description of Related Art

Flash is an essential tool used to irradiate an object to be photographed. It is usually used when available light is dim or when the quality of light need be altered. The flash may be built-in or plug-in.

Conventional cameras have means for control lighting and intensity of the flash. However, the precision and stability of the flash oftentimes become worse after repairing or replacing flash-related component, such as a capacitor or a cover of the flash, or due to aged flash.

For the reason stated above, a need has arisen to propose a flash control method for a digital camera to maintain the precision and stability of the flash.

SUMMARY OF THE INVENTION

In view of the foregoing, it is an object of the embodiment of the present invention to provide a flashing control method for a digital camera. According to the embodiment, main-flash intensity and corresponding sensitivity value are obtained according to preflash brightness value and pre-constructed tables. Therefore, users may arrive at the same exposure under different settings.

According to one embodiment, indices are determined respectively corresponding to sensitivity values. Next, main-flash intensities are respectively obtained with respect to the sensitivity values such that their target brightness values are substantially the same after exposure, thereby constructing an energy table. Moreover, a predetermined preflash is fired to obtain a corresponding preflash brightness value with respect to each distinct distance. Main-flash indices are respectively obtained according to maximum main-flash intensity and the energy table with respect to the distinct distances such that the target brightness values are substantially the same after exposure, thereby constructing a preflash table. During picture capturing, the main-flash intensity is obtained according to the preflash brightness value and the preflash table.

BRIEF DESCRIPTION OF THE DRAWINGS

FIG. 2 shows an energy table according to the embodiment;

FIG. 3 shows a preflash table according to the embodiment; and

DETAILED DESCRIPTION OF THE INVENTION

Figure 1:
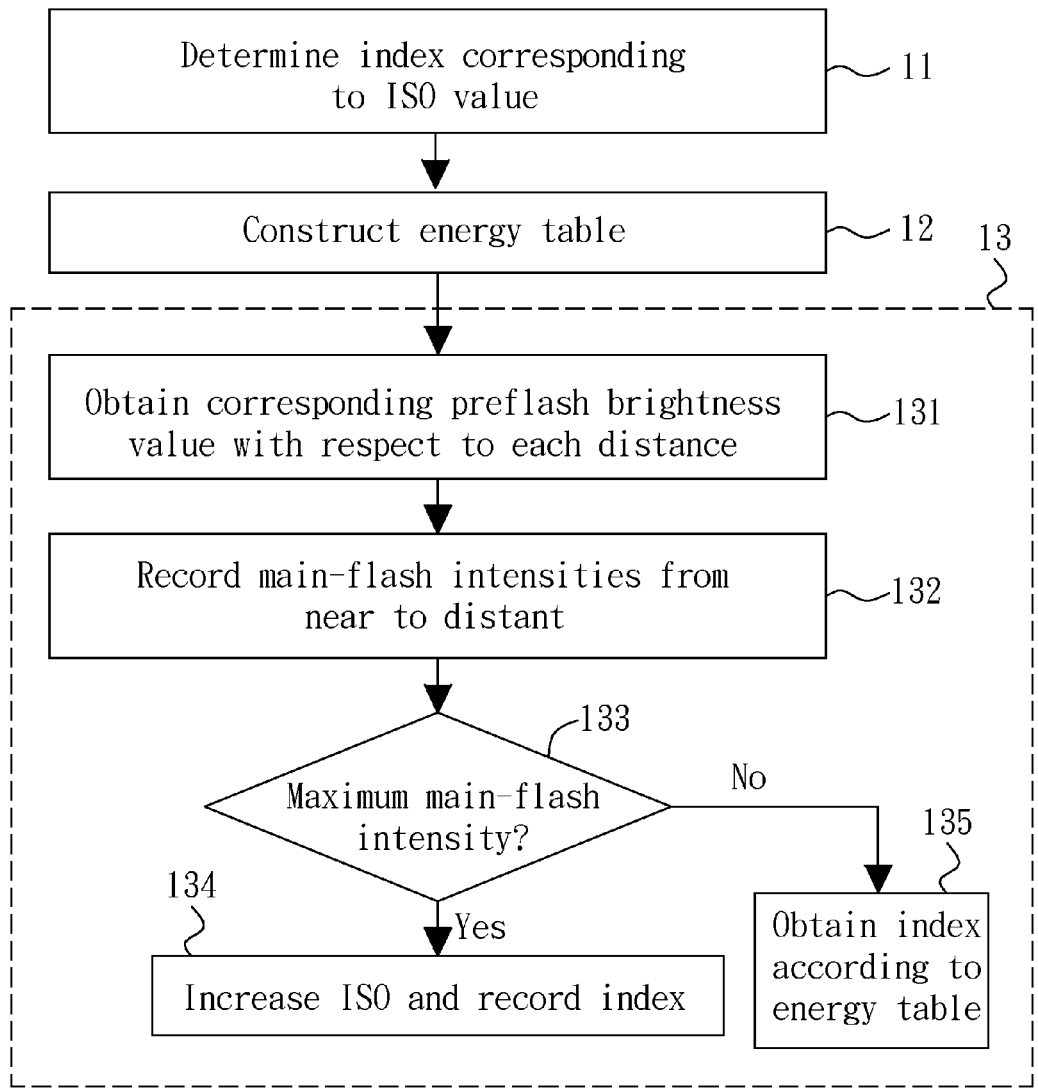
FIG. 1 shows a flow diagram that illustrates a flashing control method for a digital camera according to one embodiment of the present invention.

FIG. 1 shows a flow diagram that illustrates a flashing control method for a digital camera according to one embodiment of the present invention. In step 11, sensitivity values (commonly called ISO values) and their corresponding indices are firstly determined or defined. Table 1 shows some exemplary sensitivity values and corresponding indices.

TABLE 1

| Sensitivity value (ISO) | Index |
|---|---|
| ... | ... |
| 50 | 144 |
| ... | ... |
| 100 | 128 |
| 104 | 127 |
| ... | ... |
| 200 | 112 |
| ... | ... |
| 400 | 96 |
| ... | ... |

According to Table 1, the greater the sensitivity value is, the lesser the corresponding index is, and vice versa. In the embodiment, ISO 100 is a basis sensitivity value, whose corresponding index is 128. The range between the basis sensitivity value (i.e., ISO 100) and double the basis sensitivity value (i.e., ISO 200) is divided into sixteen. Accordingly, the corresponding index of ISO 200 becomes 112 (=128−16). Similarly, the corresponding index of ISO 50 becomes 144 (=128+16).

Subsequently, an energy table is constructed in step 12 as exemplified in FIG. 2. The energy table is used to establishing the relationship between main-flash intensity (or energy) and ISO value. In the embodiment, the main-flash intensity 15000 of the first one at the first row (i.e., at the left-top corner) is the maximum main-flash intensity, whose corresponding intensity value is ISO 100 (or index 128). In other words, the construction of the energy table begins with the maximum main-flash intensity by which a target brightness value can be achieved for a given distance. The main-flash intensities at the first row respectively correspond to indices 128, 129 . . . 143 in order. All the main-flash intensities at the first row lead to the same target brightness value. Similarly, the main-flash intensity 1422 of the first one at the second row corresponds to ISO 200, and the main-flash intensities at the second row respectively correspond to indices 144, 145 . . . 159 in order. All the main-flash intensities at the second row lead to the same target brightness value. The main-flash intensities at the other rows may be likewise obtained, therefore constructing the energy table.

Afterwards, a preflash table is constructed in step 13 as exemplified in FIG. 3. Specifically, a predetermined (constant) preflash is fired to obtain a corresponding preflash brightness value with respect to each distinct distance (sub-step 131), as shown at the first and the second rows of the preflash table. Next, in sub-step 132, main-flash intensities (e.g., 282, 560 . . . 2606) are recorded from near to distant using a basis sensitivity value (e.g., ISO 100). After the main-flash intensity reaches the maximum main-flash intensity (sub-step 133), for example, at the distance of 150 cm, the sensitivity value is increased and its corresponding index is recorded according to table 1 (sub-step 134). With respect to those distances before reaching the maximum main-flash intensity, e.g., 100 cm, 80 cm . . . 20 cm, the main-flash intensities are respectively converted to the corresponding indices according to the energy table (FIG. 2) (sub-step 135). For example, the main-flash intensity 2606 at the distance 100 cm approximately corresponds to 2655 in the energy table (FIG. 2). As the distance between the main-flash intensity 2655 and the maximum main-flash intensity (with index 128) is 6, the main-flash intensity 2606 therefore has a corresponding index 134 (=128+6). The indices converted from the main-flash intensities (e.g., the enclosed ones in FIG. 2) at other distances may be similarly obtained. According to the construction of the preflash table in sub-steps 131 to 135, the main-flash indices are respectively obtained according to the maximum main-flash intensity and the energy table with respect to the distinct distances such that the target brightness values are substantially the same after exposure of the digital camera.

Figure 4:
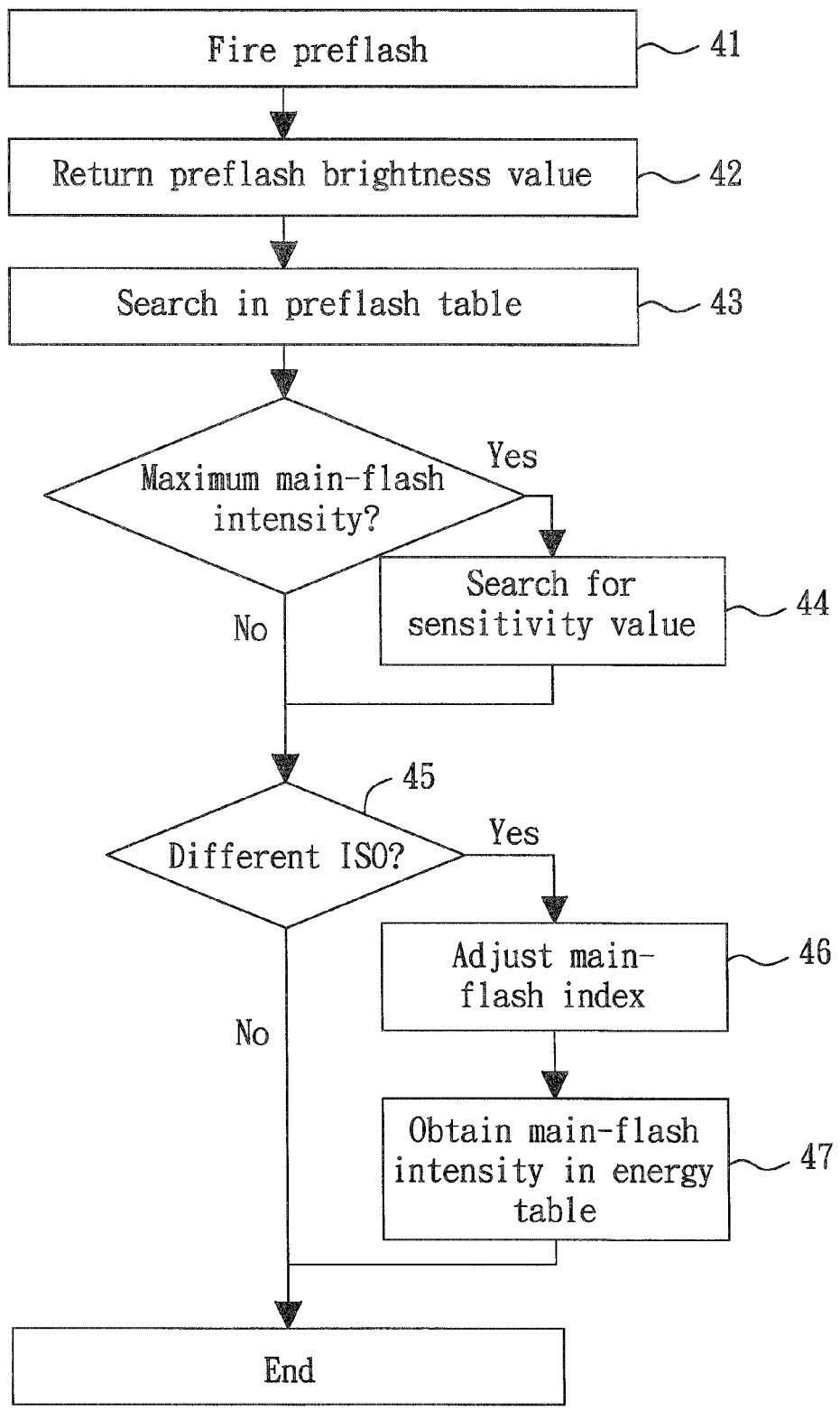
FIG. 4 shows a flow diagram that illustrates picture capturing according to one embodiment of the present invention.

FIG. 4 shows a flow diagram that illustrates picture capturing according to one embodiment of the present invention. In step 41, preflash is fired to obtain the returned preflash brightness value (step 42). Subsequently, in step 43, search for the main-flash intensity and the corresponding main-flash index in the preflash table (FIG. 3) by interpolation according to the preflash brightness value (if the maximum main-flash intensity has been reached, the sensitivity value is searched instead (step 44)). The picture capturing may accordingly be proceeded.

If the sensitivity value needs be adjusted according to application requirement (step 45), the main-flash index obtained in step 43 then needs be accordingly adjusted (step 46). For example, assume that the original (basis) sensitivity value is ISO 100 (with corresponding index 128) and the original main-flash index 128 is obtained in step 43. When the sensitivity value is adjusted to new value of ISO 200 (with corresponding index 112=128−16) according to application requirement, the new main-flash index needs be accordingly adjusted to 144 (=128+16). The adjustment satisfies the following equation:

original main-flash index+original index (corresponding to the original sensitivity value)=new main-flash index+new index (corresponding to the new sensitivity value).

Afterwards, in step 47, search for the main-flash intensity in the energy table (FIG. 2) according to the new main-flash index (e.g., 144). The picture capturing may accordingly be proceeded. For example, as the new main-flash index is adjusted to 144, the main-flash intensity of 1422 may be obtained according to the energy table.

Although specific embodiments have been illustrated and described, it will be appreciated by those skilled in the art that various modifications may be made without departing from the scope of the present invention, which is intended to be limited solely by the appended claims.

What is claimed is:

1. A flashing control method for a digital camera, comprising:
    determining indices respectively corresponding to sensitivity values;
    respectively obtaining main-flash intensities with respect to the sensitivity values such that their target brightness values are substantially the same after exposure, thereby constructing an energy table;
    firing a predetermined preflash to obtain a corresponding preflash brightness value with respect to each distinct distance;
    respectively obtaining main-flash indices according to maximum main-flash intensity and the energy table with respect to the distinct distances such that the target brightness values are substantially the same after exposure, thereby constructing a preflash table; and
    obtaining the main-flash intensity according to the preflash brightness value and the preflash table during picture capturing;
    wherein the preflash table is constructed according to the following steps:
    recording the main-flash intensities from near to distant using a basis sensitivity value;
    increasing the sensitivity value and recording the corresponding index after the main-flash intensity reaches the maximum main-flash intensity; and
    respectively converting the main-flash intensities to the corresponding indices according to the energy table before the main-flash intensity reaches the maximum main-flash intensity.

2. The method of claim 1, in the step of determining the indices, the greater the sensitivity value is, the lesser the corresponding index is.

3. The method of claim 2, in the step of determining the indices, a range between the basis sensitivity value and double the basis sensitivity value is divided into sixteen.

4. The method of claim 3, wherein the basis sensitivity value is ISO 100.

5. The method of claim 1, wherein the first main-flash intensity value of the energy table is the maximum main-flash intensity value with the corresponding sensitivity value ISO 100.

6. The method of claim 1, wherein the basis sensitivity value is ISO 100.

7. The method of claim 1, in the step of picture capturing, further comprising a step of obtaining the corresponding main-flash intensity by interpolation.

8. The method of claim 1, after the step of picture capturing, further comprising:
    determining a new sensitivity value and obtaining the corresponding main-flash intensity according to the energy table.

9. The method of claim 1, wherein the step of picture capturing comprising:
    searching for an original main-flash index in the preflash table according to the preflash brightness value, wherein the original main-flash index corresponds to an original sensitivity value.

10. The method of claim 9, after the step of picture capturing, further comprising:
    obtaining a new main-flash index with respect to a new sensitivity value, wherein a sum of the original main-flash index and an original index corresponding to the original sensitivity value is equal to a sum of the new main-flash index and a new index corresponding to the new sensitivity value; and
    searching for the main-flash intensity in the energy table according to the new main-flash index.

11. A flashing control method for a digital camera, comprising:
    determining indices respectively corresponding to sensitivity values;
    respectively obtaining main-flash intensities with respect to the sensitivity values such that their target brightness values are substantially the same after exposure, thereby constructing an energy table;
    firing a predetermined preflash to obtain a corresponding preflash brightness value with respect to each distinct distance;
    respectively obtaining main-flash indices according to maximum main-flash intensity and the energy table with respect to the distinct distances such that the target brightness values are substantially the same after exposure, thereby constructing a preflash table; and obtaining the main-flash intensity according to the preflash brightness value and the preflash table during picture capturing;

wherein the step of picture capturing comprising: searching for an original main-flash index in the preflash table according to the preflash brightness value, wherein the original main-flash index corresponds to an original sensitivity value.

12. The method of claim 11, in the step of determining the indices, the greater the sensitivity value is, the lesser the corresponding index is.

13. The method of claim 12, in the step of determining the indices, a range between a basis sensitivity value and double the basis sensitivity value is divided into sixteen.

14. The method of claim 13, wherein the basis sensitivity value is ISO 100.

15. The method of claim 11, wherein the first main-flash intensity value of the energy table is the maximum main-flash intensity value with the corresponding sensitivity value ISO 100.

16. The method of claim 11, wherein the preflash table is constructed according to the following steps:

recording the main-flash intensities from near to distant using a basis sensitivity value;

increasing the sensitivity value and recording the corresponding index after the main-flash intensity reaches the maximum main-flash intensity; and respectively converting the main-flash intensities to the corresponding indices according to the energy table before the main-flash intensity reaches the maximum main-flash intensity;

wherein, the basis sensitivity value is ISO 100.

17. The method of claim 11, in the step of picture capturing, further comprising a step of obtaining the corresponding main-flash intensity by interpolation.

18. The method of claim 11, after the step of picture capturing, further comprising:

determining a new sensitivity value and obtaining the corresponding main-flash intensity according to the energy table.

19. The method of claim 11, after the step of picture capturing, further comprising:

obtaining a new main-flash index with respect to a new sensitivity value, wherein a sum of the original main-flash index and an original index corresponding to the original sensitivity value is equal to a sum of the new main-flash index and a new index corresponding to the new sensitivity value; and searching for the main-flash intensity in the energy table according to the new main-flash index.

* * * * *